(12) United States Patent
Shaffer

(10) Patent No.: US 12,392,388 B1
(45) Date of Patent: Aug. 19, 2025

(54) SHOCK ADJUSTER

(71) Applicant: Fox Factory, Inc., Duluth, GA (US)

(72) Inventor: Samuel Shaffer, Ben Lomond, CA (US)

(73) Assignee: Fox Factory, Inc., Duluth, GA (US)

( * ) Notice: Subject to any disclaimer, the term of this patent is extended or adjusted under 35 U.S.C. 154(b) by 406 days.

(21) Appl. No.: 17/966,573

(22) Filed: Oct. 14, 2022

Related U.S. Application Data

(60) Provisional application No. 63/255,790, filed on Oct. 14, 2021.

(51) Int. Cl.
  *F16F 9/46* (2006.01)
  *F16F 9/02* (2006.01)

(52) U.S. Cl.
  CPC ............ *F16F 9/462* (2013.01); *F16F 9/0236* (2013.01); *F16F 9/0281* (2013.01); *F16F 2230/0064* (2013.01)

(58) Field of Classification Search
  None
  See application file for complete search history.

(56) References Cited

U.S. PATENT DOCUMENTS

| | | | |
|---|---|---|---|
| 2,003,255 A | * | 5/1935 | Duff .......................... E21B 1/02 |
| | | | 384/417 |
| 7,147,207 B2 | | 12/2006 | Jordan et al. |
| 8,356,829 B2 | | 1/2013 | Shirai |
| 8,622,180 B2 | | 1/2014 | Wootten et al. |
| 9,273,746 B2 | | 3/2016 | Chen et al. |
| 9,593,736 B2 | | 3/2017 | Jordan et al. |
| 10,578,179 B2 | | 3/2020 | Laird |
| 11,041,537 B2 | | 6/2021 | Yablon et al. |
| 2011/0012317 A1 | * | 1/2011 | Mouri ....................... F16F 9/56 |
| | | | 280/5.519 |

* cited by examiner

*Primary Examiner* — Melanie Torres Williams

(57) ABSTRACT

Described herein is a shock adjuster comprising a remote pulley, a pulley shaft, wherein the pulley shaft is coupled to the remote pulley at a first end, wherein the pulley shaft is coupled to an air spring cam shaft at a second end, an air spring needle, wherein the position of the air spring needle is determined by the position of the air spring cam shaft, wherein an air spring shim is engageable with the air spring needle, an open mode adjuster, a compression cam shaft, wherein the compression cam shaft is coupled to the open mode adjuster, a compression needle, wherein the position of the compression needle is determined by the position of the compression cam shaft, and a shim, wherein the shim is coupled to the compression needle, wherein the shim is fit to open or close at least a main port in a piston.

20 Claims, 14 Drawing Sheets

SHOCK ADJUSTER

CROSS-REFERENCE TO RELATED APPLICATIONS (PROVISIONAL)

This application claims priority to and benefit of U.S. Provisional Patent Application No. 63/255,790 filed on Oct. 14, 2021, entitled "SHOCK ADJUSTER" by Sam Shaffer, and assigned to the assignee of the present application, the disclosure of which is hereby incorporated by reference in its entirety.

BACKGROUND ART

Shock absorbers commonly have features that allow users to adjust the settings for damping and rebound, or when the shock is being compressed and when it is returning to its full length. Air spring shocks typically have a chamber for damping, and a chamber for rebound. Adjusting these settings can be inconvenient for a user.

BRIEF DESCRIPTION OF THE DRAWINGS

The accompanying drawings, which are incorporated in and form a part of this specification, illustrate embodiments of the present technology and, together with the description, serve to explain the principles of the present technology.

DETAILED DESCRIPTION OF THE EMBODIMENTS

Figure 1:
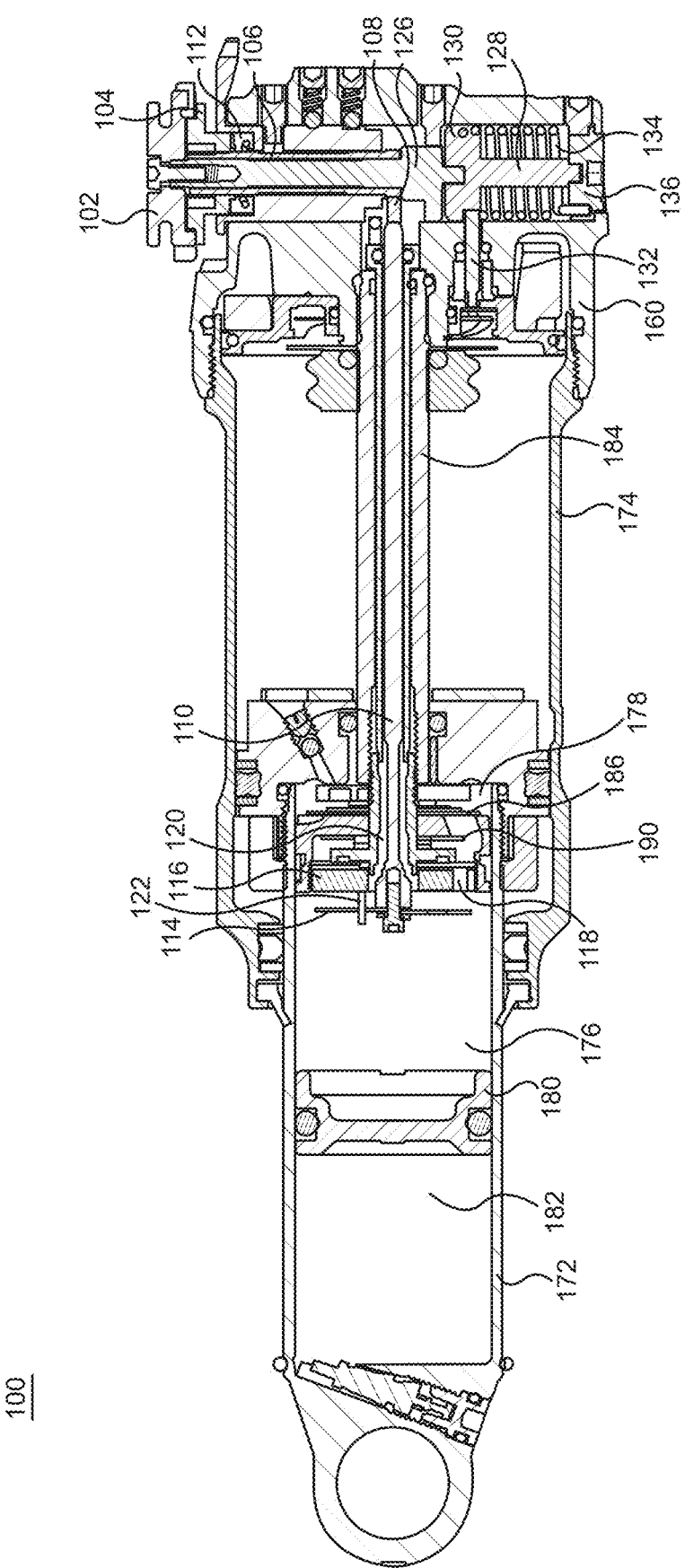
FIG. 1 shows a cross section view of an air spring shock in a first open mode.

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

Shock absorbers (e.g., dampers) are used in numerous different vehicles and configurations to absorb some or all of a movement that is received at a first portion of a vehicle before it is transmitted to a second portion of the vehicle. For example, when a wheel hits a pothole, the encounter will cause an impact force on the wheel. However, by utilizing suspension components including one or more dampers, the impact force can be significantly reduced or even absorbed completely before it is transmitted to a person on a seat of the vehicle.

Conventional damping components provide a constant damping rate during compression or extension through the entire length of the stroke. Other conventional damping components provide mechanisms for varying the damping rate. Further, in the world of bicycles, damping components are most prevalently mechanical. As various types of recreational and sporting vehicles continue to become more technologically advanced, what is needed in the art are improved techniques for varying the damping rate.

Typical shock absorbers consist of at least a cylinder with an inner diameter, a rod movably disposed within the cylinder, and a main damping piston coupled to the rod. The main damping piston is configured to divide the cylinder into a compression chamber and a rebound chamber.

Such shock absorbers may be monotube, or two concentric cylinders. The main damping piston may be vented or solid. Internal bypasses or external bypasses may also be present. Some shock absorbers have an external reservoir with a bladder or floating piston.

For additional detail and description of a shock absorber/damper, see, as an example, U.S. Pat. No. 10,576,803 the content of which is incorporated by reference herein, in its entirety. For additional detail and description of position-sensitive shock absorber/damper, see, as an example, U.S. Pat. No. 6,296,092 the content of which is incorporated by reference herein, in its entirety.

Air spring shocks are another common type of shock, where an air chamber is utilized for rebound control instead of a coil over spring. For additional detail and description of air spring shock absorber/damper, see, as an example, U.S. Pat. No. 8,869,959 the content of which is incorporated by reference herein, in its entirety.

It should be understood that while an air spring shock is shown in the example embodiments, other types of suspension systems (e.g., coil over), are able to utilize the embodiments described herein. It should be understood that within the detailed description, relative terms such as "top", "left", "right", "lower", etc., are used for the sake of clarity and are not intended to be limiting features.

Some embodiments have the benefit of allowing a shock absorber to have both a remote adjustment feature, as well as a pre positionable adjustment feature. In some embodiments, the unique features include the remote adjustment feature being able to affect the pre positionable adjustment feature, without the reverse being true. This allows for a user to have a broader range of adjustments they can make, as well as have remote access to the bigger adjustments while riding a bike or vehicle.

Previous inventions struggled to combine remote adjustment features and pre positionable adjustment features into a single mechanism, especially in a simple and intuitive manner that some embodiments achieve.

Another draw back of previous inventions was the complexity of their designs, as well as some aspects such as adjustments in one direction being more difficult to make than in the other (for example, it would be harder for a user to make the damping stiffer than it would be to make it softer).

FIG. 1 shows a cross section view of an air spring shock 100 in a first open mode. Also included are remote pulley 102, open mode adjuster 104, compression cam shaft 106, compression cam surface 108, compression needle 110, adjuster spring 112, shim 114, piston 116, main port 118, central port 120, pin 122, pulley shaft 126, air spring cam shaft 128, air spring cam surface 130, air spring needle 132, torsional spring 134, and spring retainer 136.

In some embodiments, air spring shock is comprised of a damping cylinder 172 and an air spring cylinder 174, where the damping cylinder 172 assists with damping and the air spring cylinder 174 assists with rebound. Within the damping cylinder 172 the piston 116 (sometimes referred to as main damping piston) is configured for operation and divides the damping cylinder 172 into a compression chamber 176 and a rebound chamber 178. Furthermore, in this embodiment an internal floating piston (IFP) 180 divides the compression chamber 176 from the gas chamber 182. The pressure within gas chamber 182 will affect the dampening rate of air spring shock 100.

In some embodiments, damping cylinder 172 telescopically compresses within the air spring cylinder 174. In some embodiments, rod 184 extends through the air spring cylinder and part way into the damping cylinder such that when compression occurs rod 184 holds piston 116 in place as the damping cylinder 172 moves. In some embodiments, rod 184 is coupled to piston 116 on one end, and is coupled to body cap 160 on the other end. In some embodiments, rod 184 is hollow, such that compression needle 110 is located within rod 184.

As the shock 100 is compressed, the damping chamber 176 will decrease in volume and the rebound chamber 178 increases in volume as the working fluid within the damping chamber 176 flows into rebound chamber 178. In some embodiments, compression shim stack 186 is used to manage fluid flow during a compression stroke and prevent flow during a rebound stroke. Similarly, rebound shim stack 190 is used to manage fluid flow during a rebound stroke and prevent flow during a compression stroke.

It should be understood that in some embodiments the remote pulley 102 may be in an open mode, a middle mode, or a closed mode, while in some embodiments, the position of the open mode adjuster 104 are referred to as a first mode, a second mode, and a third mode. For the sake of clarity and brevity, the combinations of the positions of the remote pulley 102 and the open mode adjuster 104 are referred to as: first open mode, second open mode, third open mode, middle mode, and closed mode. While these are the available modes shown in the figured embodiments, it should be understood that more or fewer modes may be utilized in some embodiments. Further, it should be understood that while the figured embodiments do not have multiple middle and closed mode combinations (unlike the open mode), some embodiments allow for similar combinations of the middle and closed modes.

In some embodiments, a first open mode would be ideal for a smooth downhill terrain, where a user might want more compression damping or to reduce pedal bob. In some embodiments, the third open mode would be more ideal for rough terrain where a user still wants more damping than the middle and closed positions offer.

In some embodiments, remote pulley 102 is used to make coarse adjustments to the damping of the air spring shock 100 (e.g., open, middle, and closed mode), while open mode adjuster 104 is used to make finer adjustments while the shock 100 is in an open mode (e.g., first, second, and third open mode). In some embodiments, the open mode adjuster 104 allows for compression setting adjustments to be made without affecting the settings of the remote pulley 102.

In some embodiments, open mode adjuster 104 is manually rotated to change the setting it is on. In some embodiments, open mode adjuster 104 has at least two settings. In the figured embodiments, open mode adjuster has three different possible settings. In some embodiments, open mode adjuster 104 is manually adjusted by a user pushing open mode adjuster 104 away from remote pulley 102 and rotating the open mode adjuster 104 to a new position, while the position of remote pulley 102 is unchanged due to open mode adjuster 104 disengaging. In some embodiments, adjuster spring 112 keeps the open mode adjuster 104 biased in a position against the remote pulley 102.

In some embodiments, open mode adjuster is coupled to the compression cam shaft 106. As the compression cam shaft 106 is rotated with open mode adjuster 104, compression cam surface 108 will push against compression needle 110. In some embodiments, compression cam surface 108 has an inconsistent diameter such that the position of compression needle 110 will vary as the compression cam shaft 106 is rotated. The diameter of compression cam surface 108 can also be seen in at least FIG. 7. In some embodiments, the profile of the compression needle 110 acts to change the fluid flow allowed through the central port 120 with the movement of the compression needle. In some embodiments, the position of the compression needle is determined by the position of the compression cam shaft. In some embodiments, central port 120 allows fluid flow through piston 116. Similar to the main ports 118, central port 120 is also closed off from fluid flow when shim 114 is fully closed.

In some embodiments, compression needle 110 is coupled to shim 114. Shim 114 alters the flow through the main ports 118 of piston 116 (sometimes referred to as main damping piston 114). As the open mode adjuster 104 is switched between settings, leading to movement of the compression needle 110, the distance between shim 114 and piston 116 will change. In some embodiments, the change in distance from the open mode adjuster 104 settings is small as the open mode adjuster 104 is for fine tuning. In some embodiments, none of the open mode adjuster settings will result in the shim 114 closing the main ports 118 of piston 116. Main ports 118 can be seen more clearly in at least FIG. 2. In some embodiments, shim 114 is fit to open or close a main port in a piston In some embodiments, movement of compression needle 110 will also restrict fluid flow through central port 120 due to a variance of the diameter of compression needle 110.

Figure 2:
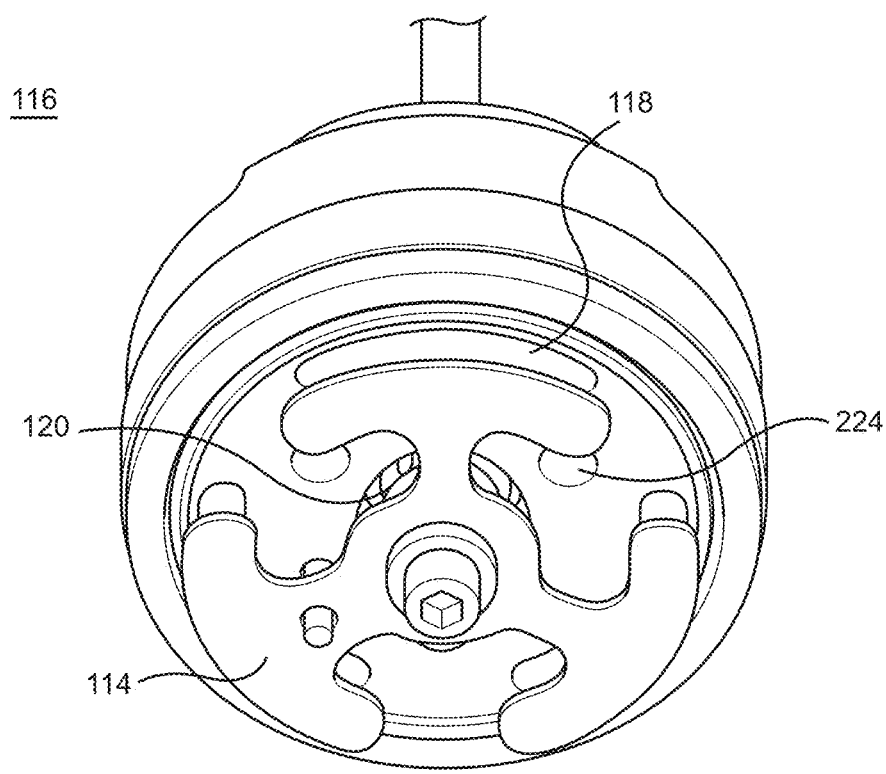
FIG. 2 shows a perspective view of the piston in a first open mode.

FIG. 2 shows a perspective view of the piston 116 in a first open mode. In some embodiments, such as that shown in at least FIG. 2, main ports 118 are not circular and shim 114 is of an appropriate shape to cover main ports 118 and not the blow off valves 224. In some embodiments the main ports 118 are of a shape similar to a kidney bean. In some embodiments, pin 122 is used to keep shim 114 from becoming misaligned with main ports 118. In some embodiments, shim 114 is a tri load plate.

In some embodiments, blow off valves 224 are not covered by shim 114, and allow for fluid flow during a compression stroke even when shim 114 is in a closed position. In some embodiments, blow off valves 224 are located closer to the center of the piston 116 than the main ports 118. In some embodiments, main ports 118 allow for a greater flow volume than the blow off valves 224.

Returning to FIG. 1, remote pully 102 is operated remotely, for example by a lever on the handlebar of a bike. In some embodiments, the remote pully 102 is actuated by mechanisms such as a solenoid, a motor, or an electronic system, however it should be understood that the actuation method is not a limiting factor and that other systems may be utilized. In some embodiments, the rotation of remote pulley 102 causes open mode adjuster 104 to be rotated.

Figure 14:
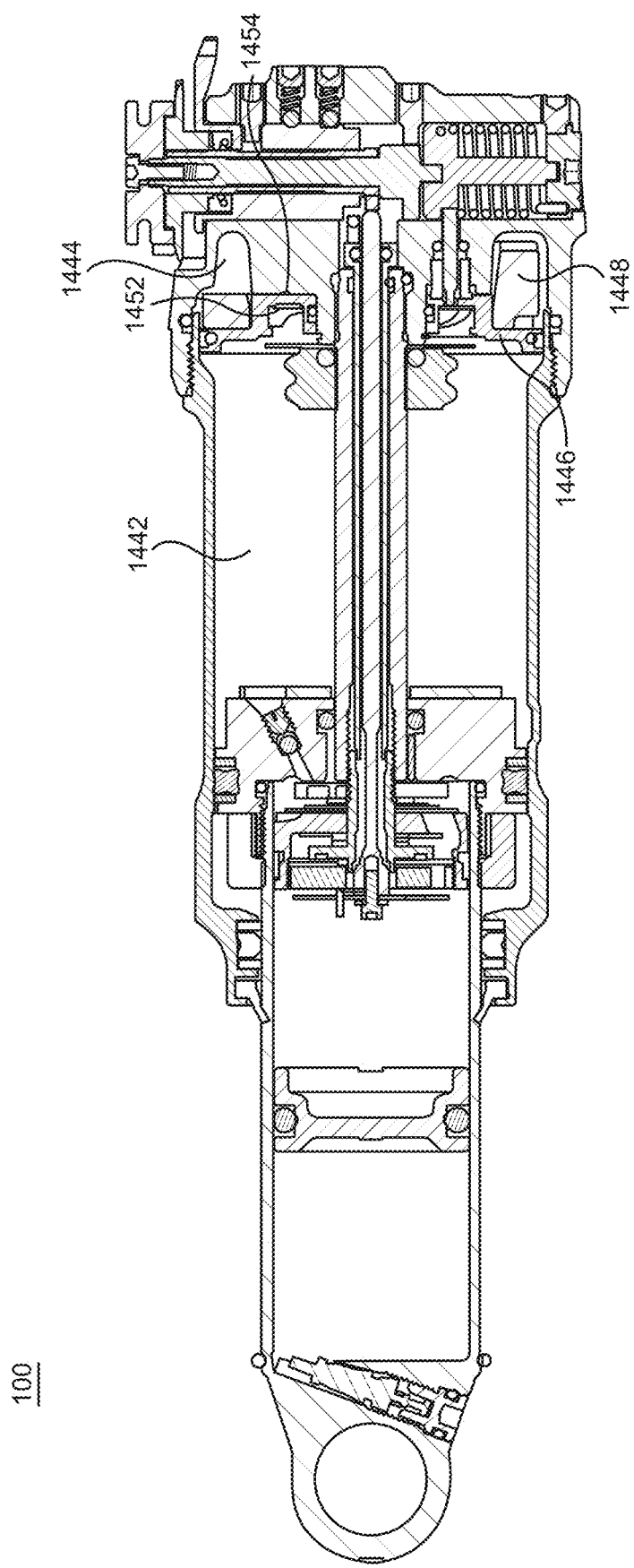
FIG. 14 shows a cross section view of an air spring shock in a middle mode.
Figure 17:
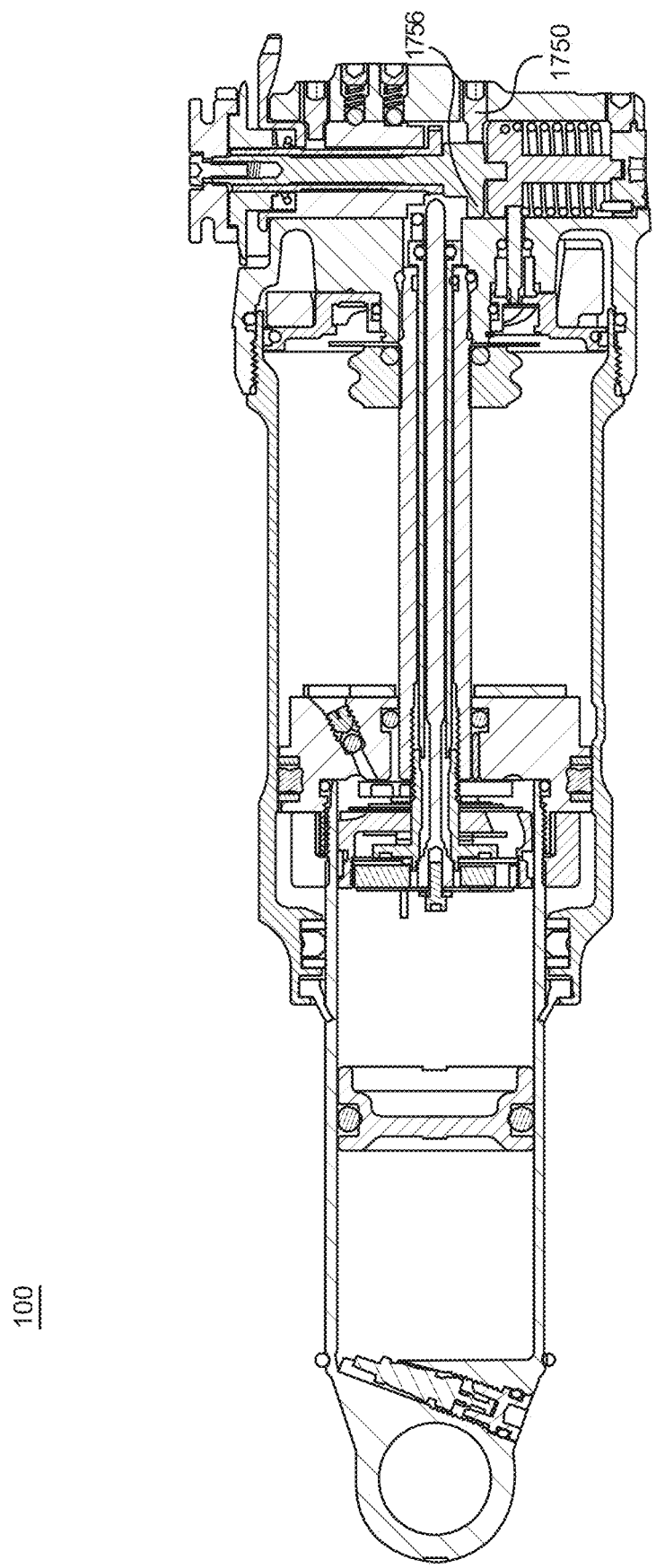
FIG. 17 shows a cross section view of an air spring shock in a closed mode.

In some embodiments, remote pulley 102 controls coarse adjustments to the damping of the air spring shock 100. In some embodiments, remote pulley has three setting options of open, middle, and closed. At least FIG. 14 and FIG. 17 illustrate the middle and closed positions respectively.

In some embodiments, pulley shaft 126 is coupled to remote pulley at a first end, and pulley shaft 126 is unaffected by the rotation of open mode adjuster 104. Pulley shaft 126 is also coupled to the air spring cam shaft 128 at a second end, such that the rotation of pulley shaft 126 will rotate the air spring cam shaft 128. With the rotation of air spring cam shaft 128, air spring cam surface 130 will press against air spring needle 132 to alter the position of air spring needle 132. In some embodiments, the position of the air spring needle 132 is determined by the position of the air spring cam shaft 128.

Torsional spring 134 is used to bias air spring cam shaft 128 to an open or closed position depending on the settings when installed. Torsional spring 134 is held in place between the air spring cam surface 130 and spring retainer 136. As remote pulley 102 is rotated, torsional spring 134 is either wound or unwound depending on the direction rotated.

Adjustments to the air spring via the remote pulley 102 will be discussed in further detail with FIG. 14 and FIG. 17.

Figure 3:
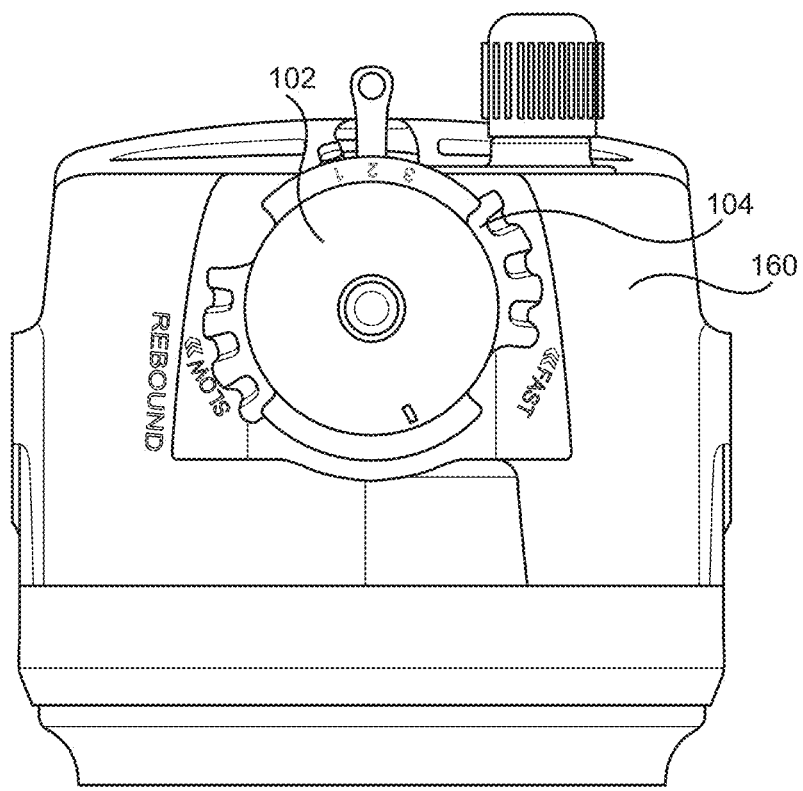
FIG. 3 shows a front external perspective view of remote pulley and open mode adjuster in a first open mode.

FIG. 3 shows a front external perspective view of remote pulley 102 and open mode adjuster 104 in a first open mode.

Figure 4:
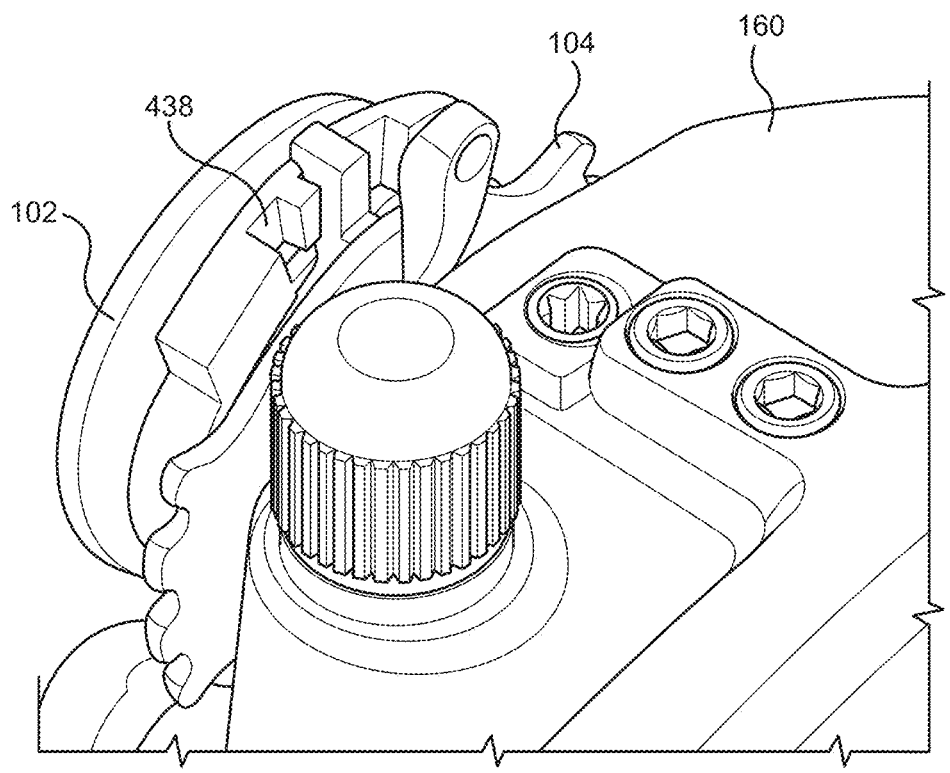
FIG. 4 shows a rear external perspective view of remote pulley and open mode adjuster in a second open mode.

FIG. 4 shows a rear external perspective view of remote pulley 102 and open mode adjuster 104 in a second open mode. From this view, open mode adjuster 104 can be seen to fit into one of several slots 438 on remote pulley 102.

Figure 5:
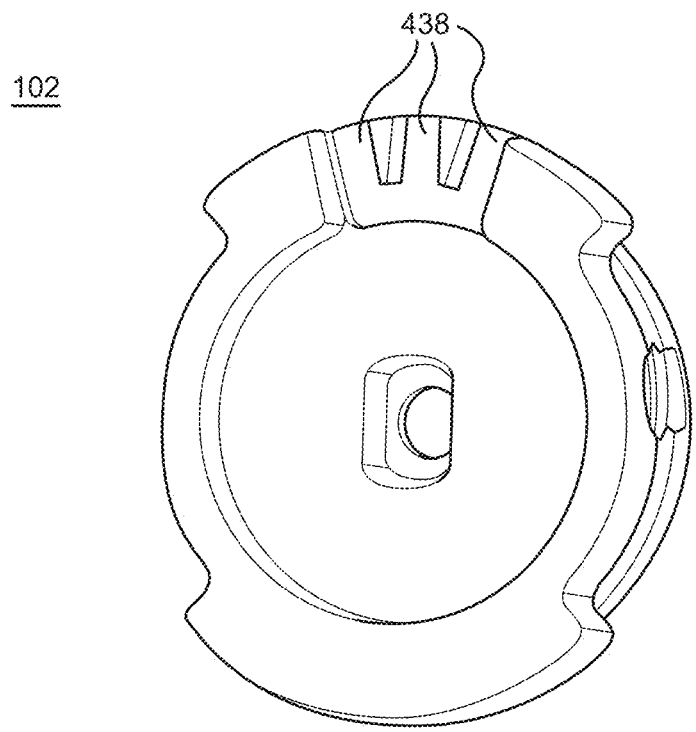
FIG. 5 shows a perspective view of remote pulley.

FIG. 5 shows a perspective view of remote pulley 102. In this view, slots 438 can be better seen as well as the recess which the open mode adjuster 104 conforms to.

Figure 6:
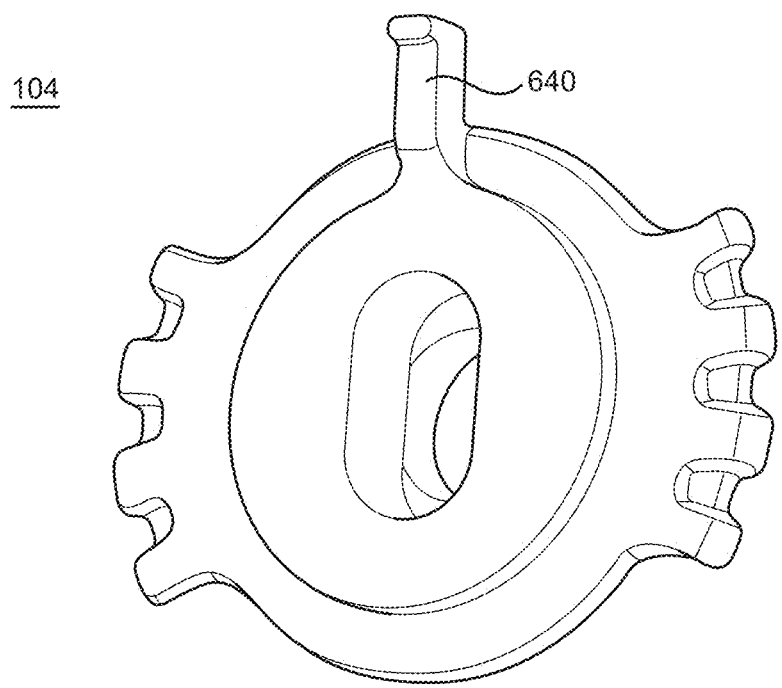
FIG. 6 shows a perspective view of open mode adjuster.

FIG. 6 shows a perspective view of open mode adjuster 104. Here, indicator 640 can be clearly seen. In some embodiments, indicator 640 aligns with the slots 438 of the remote pulley 102, as well as indicate to a user which setting the open mode adjuster 104 is currently in.

Figure 7:
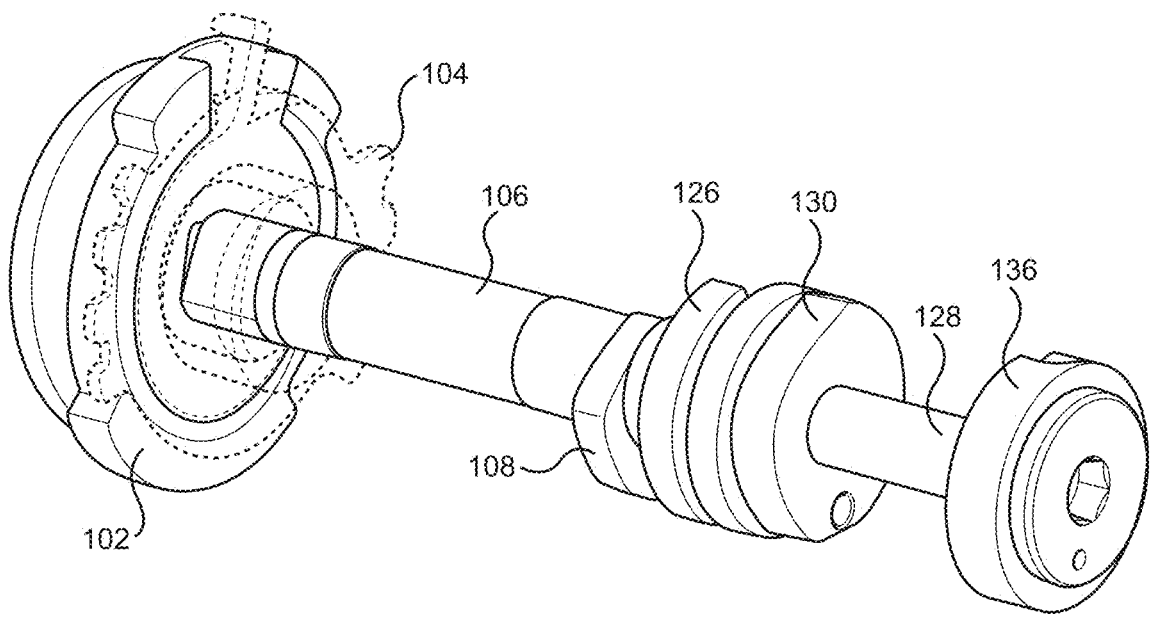
FIG. 7 shows a perspective view of remote pulley, open mode adjuster, and the cam shafts coupled to each.

FIG. 7 shows a perspective view of remote pulley 102, open mode adjuster 104, and the cam shafts coupled to each. More specifically, compression cam shaft 106 along with compression cam surface 108 are coupled to the open mode adjuster 104, while pulley shaft 126, air spring cam shaft 128, air spring cam surface 130, and spring retainer 136 are coupled to the remote pulley 102.

Figure 8:
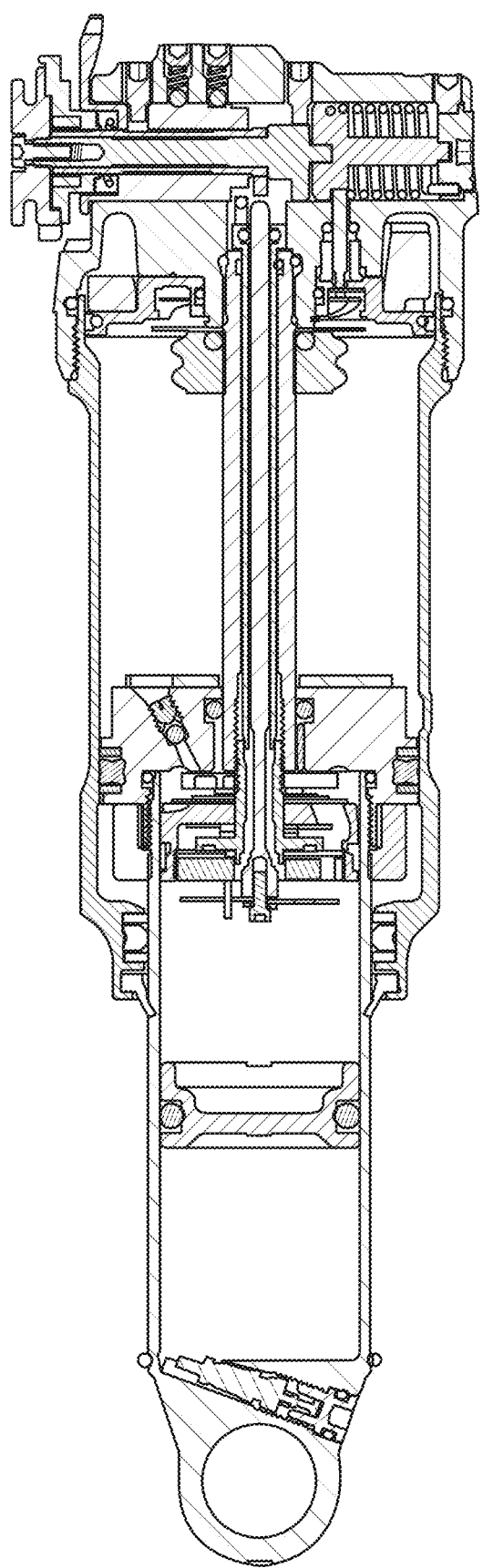
FIG. 8 shows a cross section view of an air spring shock in a second open mode.

FIG. 8 shows a cross section view of an air spring shock 100 in a second open mode. Here, the open mode adjuster is in the second position (when compared to at least FIG. 1), and the compression needle 110 and shim 114 are seen to be slightly further to the right (when compared to at least FIG. 1).

Figure 9:
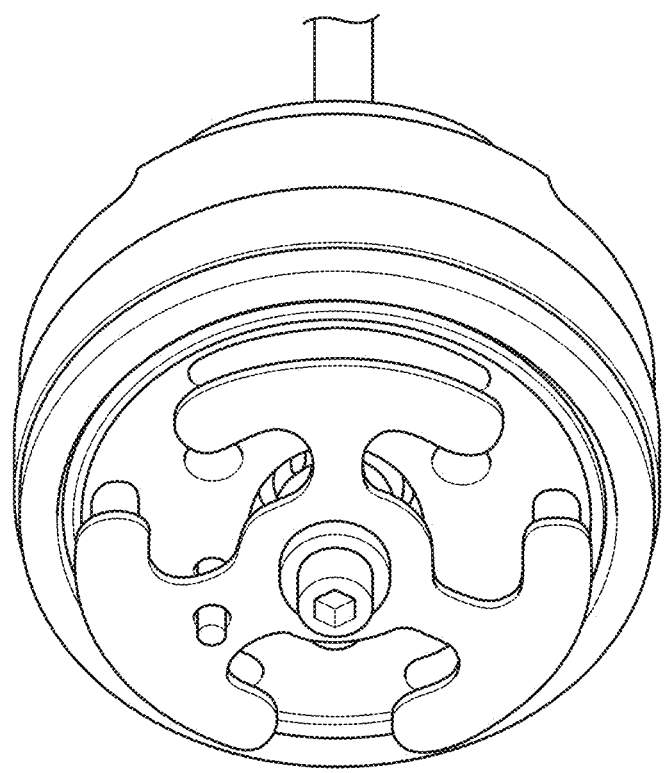
FIG. 9 shows a perspective view of the piston in a second open mode.

FIG. 9 shows a perspective view of the piston 116 in a second open mode. Here, shim 114 can be seen to be closer to the piston 116 when compared to at least FIG. 2.

Figure 10:
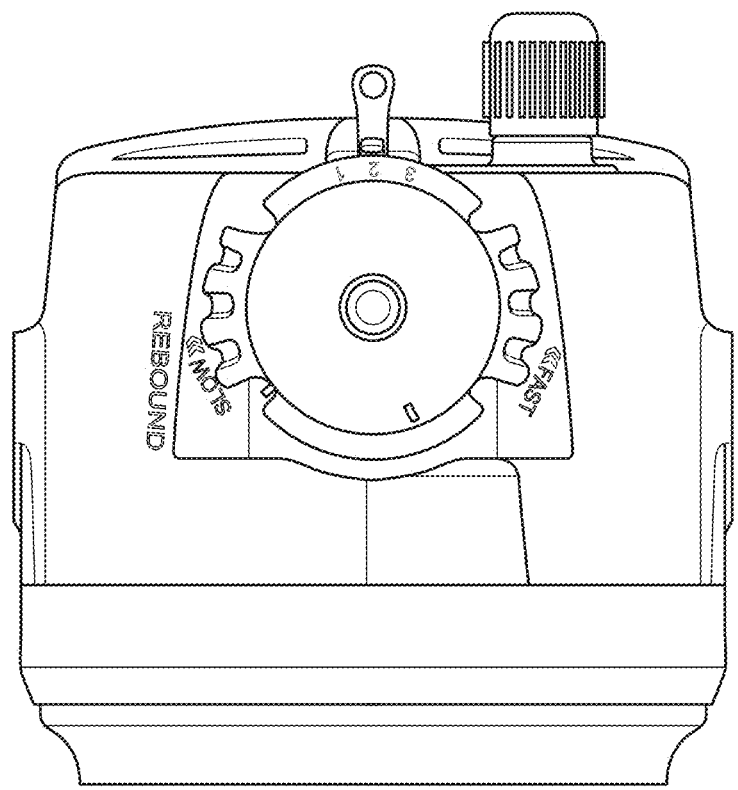
FIG. 10 shows a front external perspective view of remote pulley and open mode adjuster in a second open mode.

FIG. 10 shows a front external perspective view of remote pulley 102 and open mode adjuster 104 in a second open mode.

In some embodiments, rotation of the open mode adjuster 104 to a second open mode results in decreasing the distance between shim 114 and piston 116 as well as narrowing the fluid flow path in the central port 120. These changes result in increasing the damping of the air spring shock 100 when compared to the first open mode shown in at least FIG. 1.

Figure 11:
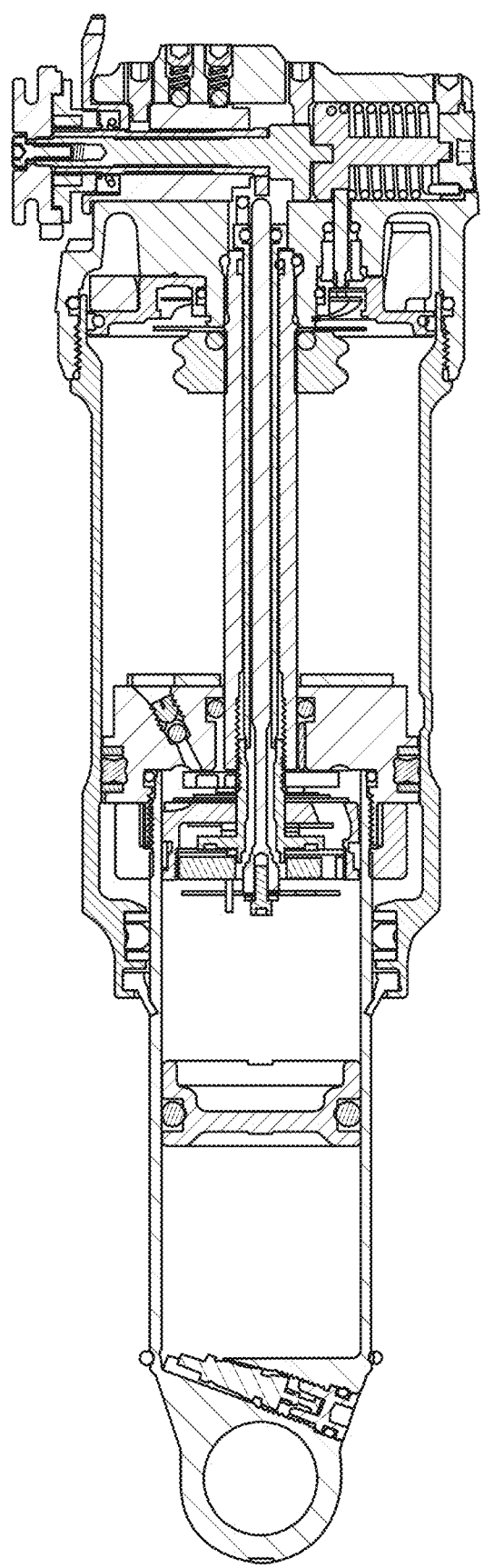
FIG. 11 shows a cross section view of an air spring shock in a third open mode.

FIG. 11 shows a cross section view of an air spring shock 100 in a third open mode. Here, the open mode adjuster is in the third position (when compared to at least FIG. 1), and the compression needle 110 and shim 114 are seen to be slightly further to the right (when compared to at least FIG. 8).

Figure 12:
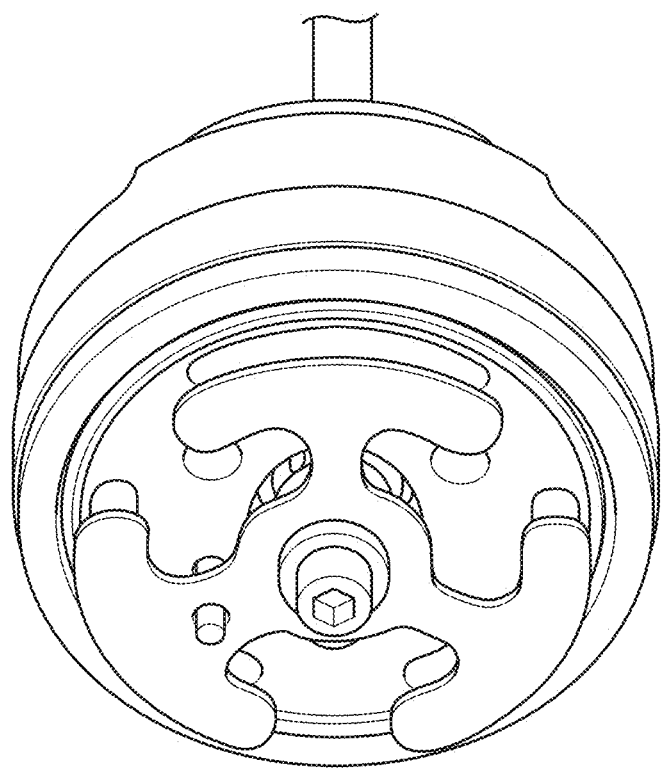
FIG. 12 shows a perspective view of the piston in a third open mode.

FIG. 12 shows a perspective view of the piston 116 in a third open mode. Here, shim 114 can be seen to be closer to the piston 116 when compared to at least FIG. 9.

Figure 13:
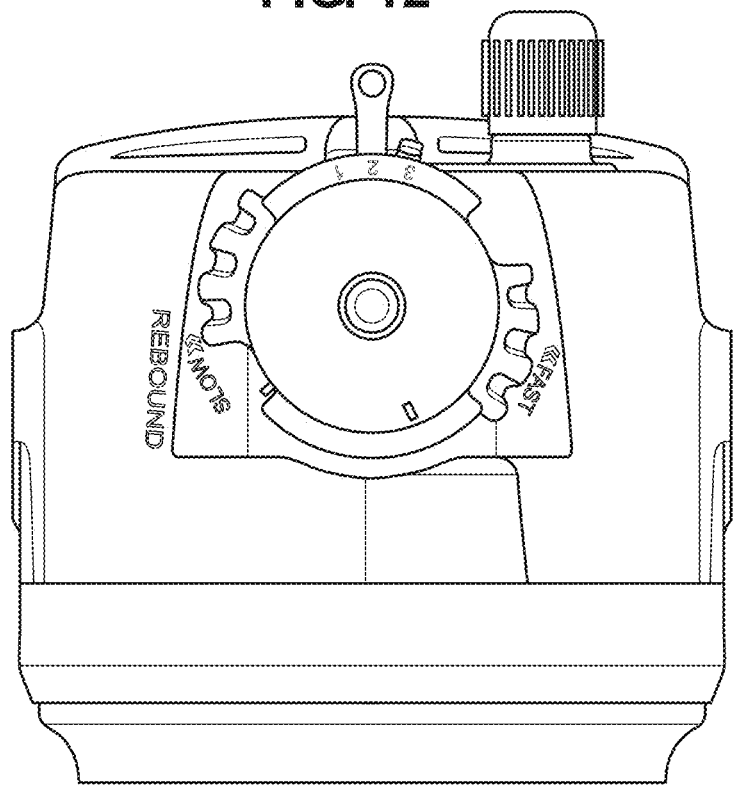
FIG. 13 shows a front external perspective view of remote pulley and open mode adjuster in a third open mode.

FIG. 13 shows a front external perspective view of remote pulley 102 and open mode adjuster 104 in a third open mode.

In some embodiments, rotation of the open mode adjuster 104 to a third open mode results in further decreasing the distance between shim 114 and piston 116 as well as narrowing the fluid flow path in the central port 120. These changes result in increasing the damping of the air spring shock 100 when compared to the first and second open mode shown in at least FIG. 1 and FIG. 8.

FIG. 14 shows a cross section view of an air spring shock 100 in a middle mode. Also included are the primary chamber 1442, auxiliary chamber 1444, air valve 1446, spacer 1448, air spring shim 1452, and ports 1454.

In some embodiments, middle mode is an adjustment made through the remote pulley 102. In some embodiments, compression needle 110 and shim 114 are moved farther to the right than any of the open mode settings to where flow through piston 116 and central port 120 is accordingly more restricted. In some embodiments, the variable profile of compression needle 110 within the central port 120 is what allows the fluid flow rate to vary.

In some embodiments, remote pulley 102 is able to affect the compression damping due to the open mode adjuster 104 being rotated along with the remote pulley 102 as it is keyed into slots 438. In some embodiments, when the open mode adjuster 104 is adjusted independently of the remote pulley 102 the rotation angles between settings is considered small (for example, 15-degree increments). However, when the remote pulley is adjusted the rotation angles between settings is comparatively large (for example, 60-degree increments). Because of this, the compression cam shaft 106 will also have a larger rotation angle when the remote pulley 102 is used, and in turn the compression needle 110 will move a larger distance than when the open mode adjuster 104 is used. In some embodiments, changing the setting the open mode adjuster is in while the remote pulley is in a middle or closed mode will not noticeably affect the position of the compression needle 110. In other words, in some embodiments the adjustment of the open mode adjuster is only effective during one of the settings of the remote pulley. In such embodiments, the open mode adjuster 104 will not noticeably affect the position of compression needle 110 due to the influence of the remote pulley 102 position being much larger than the influence of the open mode adjuster.

In some embodiments, the remote pulley 102 also makes adjustments to the rebound rate of the air spring. In some embodiments, the air spring is comprised of the primary chamber 1442 and the auxiliary chamber 1444. Air valve 1446 separates the primary chamber 1442 and the auxiliary chamber 1444. In some embodiments, spacer 1448 is used to adjust the volume of the auxiliary chamber 1444.

In some embodiments, remote pulley 102 is coupled to pulley shaft 126, which in turn is coupled to air spring cam shaft 128. Air spring cam surface 130 is used to influence the position of the air spring needle 132. Similar to compression needle 110, air spring needle 132 is coupled to an air spring shim 1452 that is used to control air flow through ports 1454 in air valve 1446.

In some embodiments, the ports in air valve 1446 are unobstructed by air spring shim 1452, but in both middle mode and closed mode (as seen in at least FIG. 17), the ports in air valve 1446 are closed by shim 1452. In some embodiments, there are more settings where the ports 1454 remain open. In some embodiments, the air spring shim 1452 is used to close off an auxiliary chamber 1444 from a primary chamber 1442.

When ports 1454 are closed, the primary chamber 1442 volume is completely separate from the auxiliary chamber 1444 volume. During this time, the primary chamber 1442 will have a greatly reduced volume than when fluidly connected to the auxiliary chamber 1444 but the pressure within the primary chamber 1442 is unchanged. Opening the ports 1454 will allow the primary chamber 1442 to regain a maximum volume, and will still remain at a constant pressure.

In some embodiments, if the shock is pressurized, then the auxiliary chamber 1444 will be pressurized too. In some embodiments, the pressure within the primary and auxiliary chambers 1442, 1444 can be adjusted through a valve (shown in at least FIG. 16, valve 1658). In some embodiments, valve 1658 is connected to auxiliary chamber 1444. It should be understood that the opening of valve 1658 into the auxiliary chamber 1444 is present in this embodiment, but is on a different plane than the cross section view shows.

Figure 15:
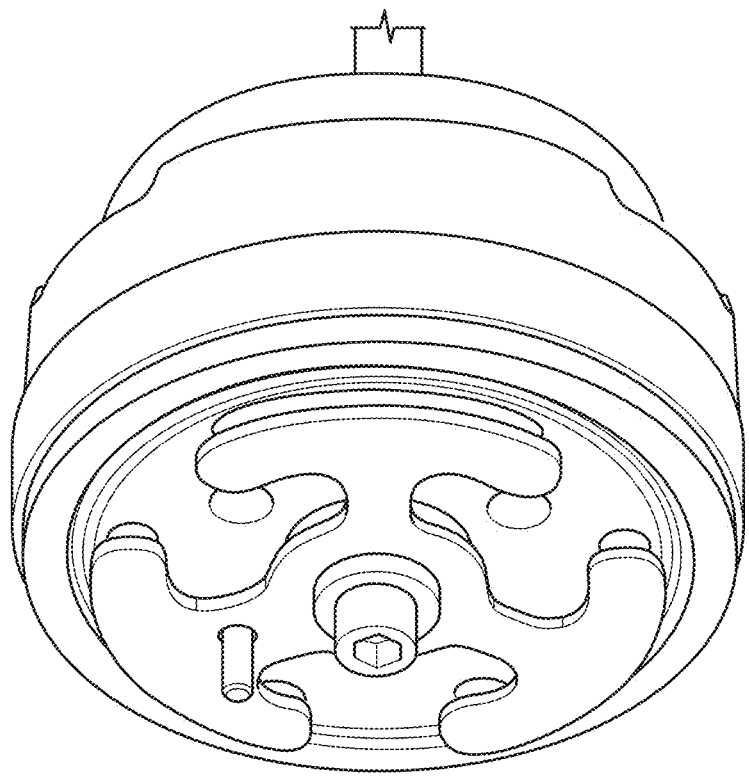
FIG. 15 shows a perspective view of the piston in a middle mode.

FIG. 15 shows a perspective view of the piston 116 in a middle mode. Here, shim 114 can be seen to be closer to the piston 116 when compared to at least FIG. 12.

Figure 16:
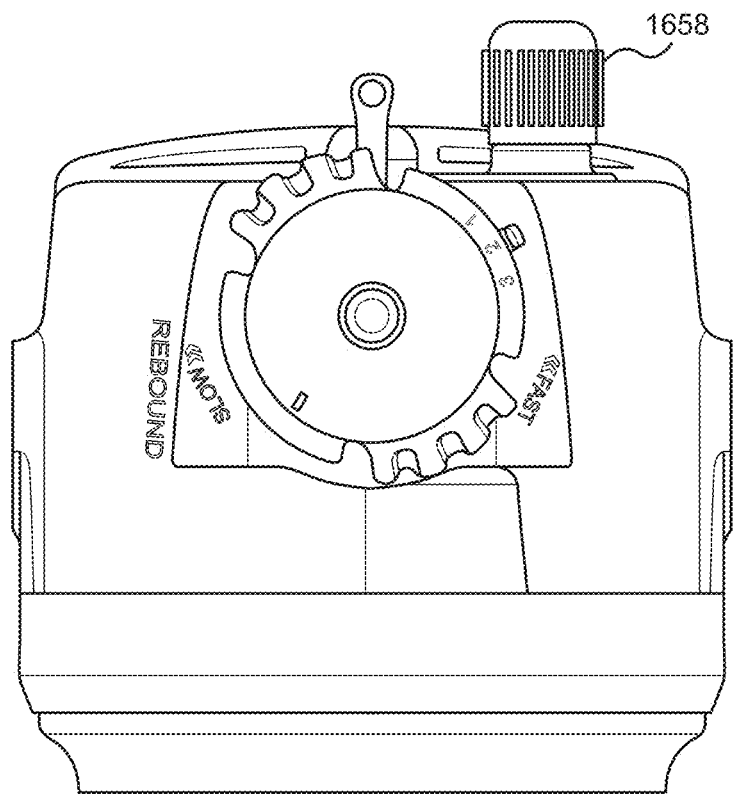
FIG. 16 shows a front external perspective view of remote pulley and open mode adjuster in a middle mode.

FIG. 16 shows a front external perspective view of remote pulley 102 and open mode adjuster 104 in a middle mode. In some embodiments, the movement of remote pulley 102 does not affect the position of the open mode adjuster 104 relative to the remote pulley 102. In other words, if the open mode adjuster 104 is keyed into the second slot of the remote pulley 102 then the open mode adjuster 104 will remain in the second slot despite rotational movement of the remote pulley 102.

FIG. 17 shows a cross section view of an air spring shock 100 in a closed mode. In some embodiments, closed mode entails both the main ports 118 of the piston 116 and the ports 1454 of air valve 1446 being closed off by their respective shims. Also included are ledge 1756, and stopper 1750.

In some embodiments, compression cam surface is shaped in such a way that it is disengaged from compression needle 110 during the closed mode setting. This disengagement allows for assurance that the compression cam surface is not causing a gap to prevent the shims 114 from completely sealing the main ports 118. In some embodiments, compression needle 110 is biased towards a closed position. In some embodiments, a spring is used to bias compression needle 110. In some embodiments, geometry is used to retain compression needle 110 to a specific range of movement.

In some embodiments, in order to limit the distance over which remote pulley 102 can be rotated stopper 1750 is placed such that a ledge 1756 will come into contact with stopper 1750 at the extremities of allowed rotation. Ledge 1756 acts to limit the rotational movement of the pulley shaft and the remote pulley.

Figure 18:
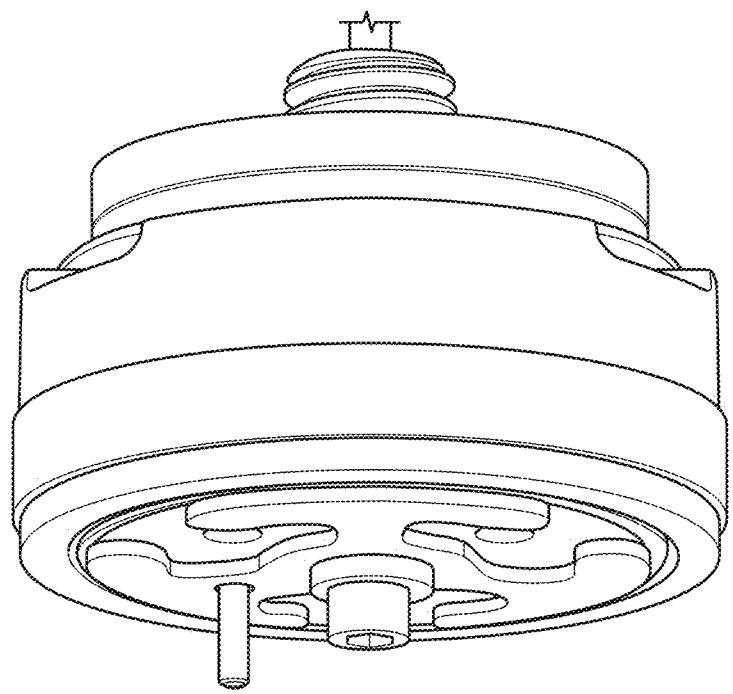
FIG. 18 shows a perspective view of the piston in a closed mode.

FIG. 18 shows a perspective view of the piston 116 in a closed mode. Here, shim 114 is fully closed to obstruct fluid flow through the main ports 118 during a compression stroke. Shims 114 will still bend during a rebound stroke to allow fluid to flow through main ports 118. Blow off valves 224 are still open to allow limited fluid flow during a compression stroke.

Figure 19:
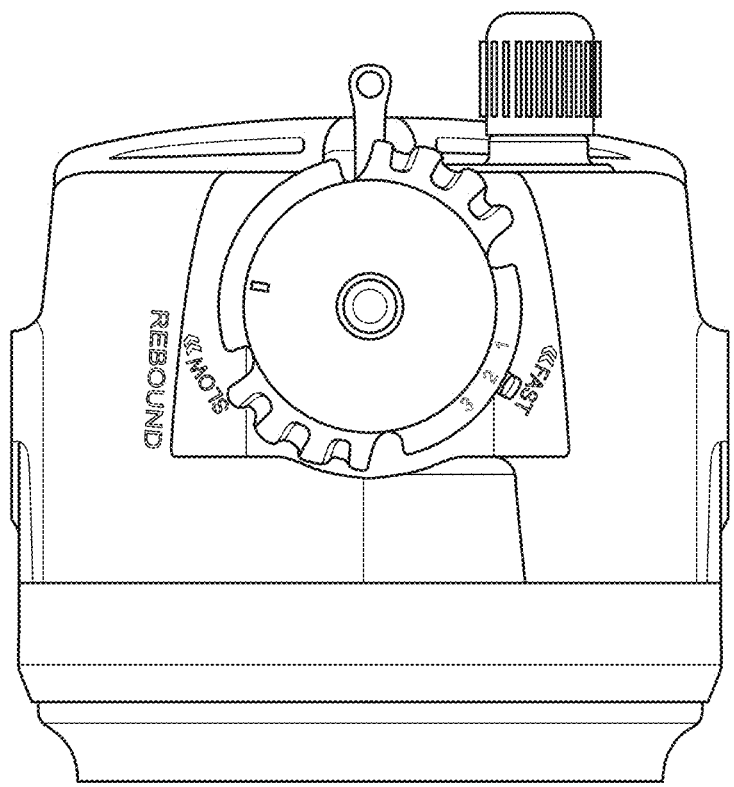
FIG. 19 shows a front external perspective view of remote pulley and open mode adjuster in a closed mode.

FIG. 19 shows a front external perspective view of remote pulley 102 and open mode adjuster 104 in a closed mode.

Figure 20:
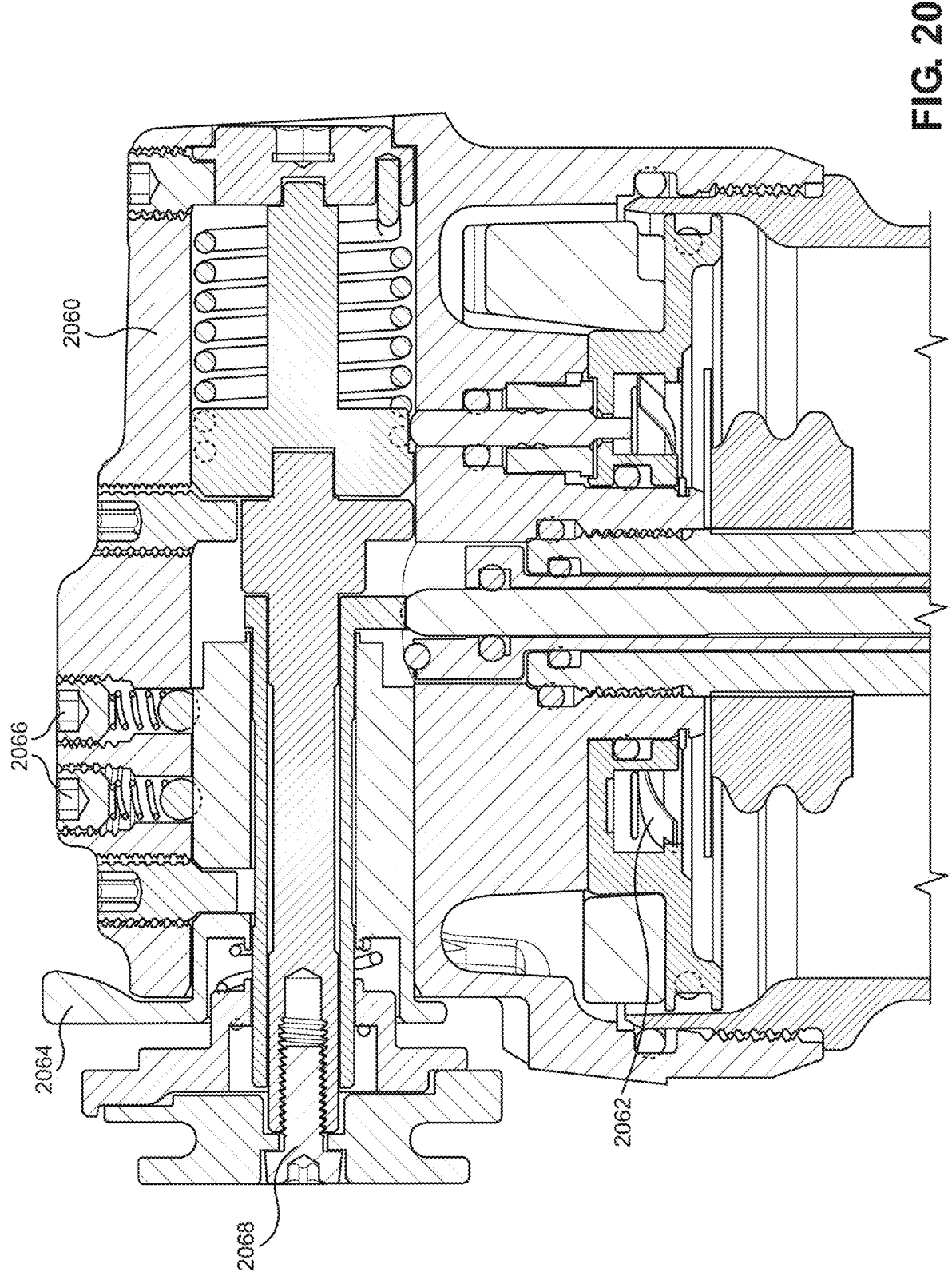
FIG. 20 shows a close-up cross section view of the body cap end of the air spring shock in a second open mode.

FIG. 20 shows a close-up cross section view of the body cap 2060 end of the air spring shock 100 in a second open mode. Also included are body cap 2060, wave spring 2062, rebound adjuster 2064, rebound screws 2066, and pulley screw 2068.

In some embodiments, wave spring 2062 is used to bias air spring shim 1452 towards a closed position during assembly. In some embodiments, air spring shim 1452 is held against the air spring needle 132 via fluid pressure after assembly is complete (in other words during operation). In some embodiments, at least the primary chamber 1442 and the auxiliary chamber 1444 are filled with a gas such as air, nitrogen, or other suitable gases. In some embodiments, pulley screw 1066 is used to couple the remote pulley 102 and the pulley shaft 126. In some embodiments, pulley shaft 126 is contoured where it meets with the air spring cam shaft 128 such that the rotation of pulley shaft 126 also rotates the air spring cam shaft 128.

In some embodiments, rebound adjuster 2064 and rebound screws 2066 are used to control rebound settings. in some embodiments, the rebound adjustment is independent of the settings controlled by remote pulley 102 and open mode adjuster 104.

Figure 21:
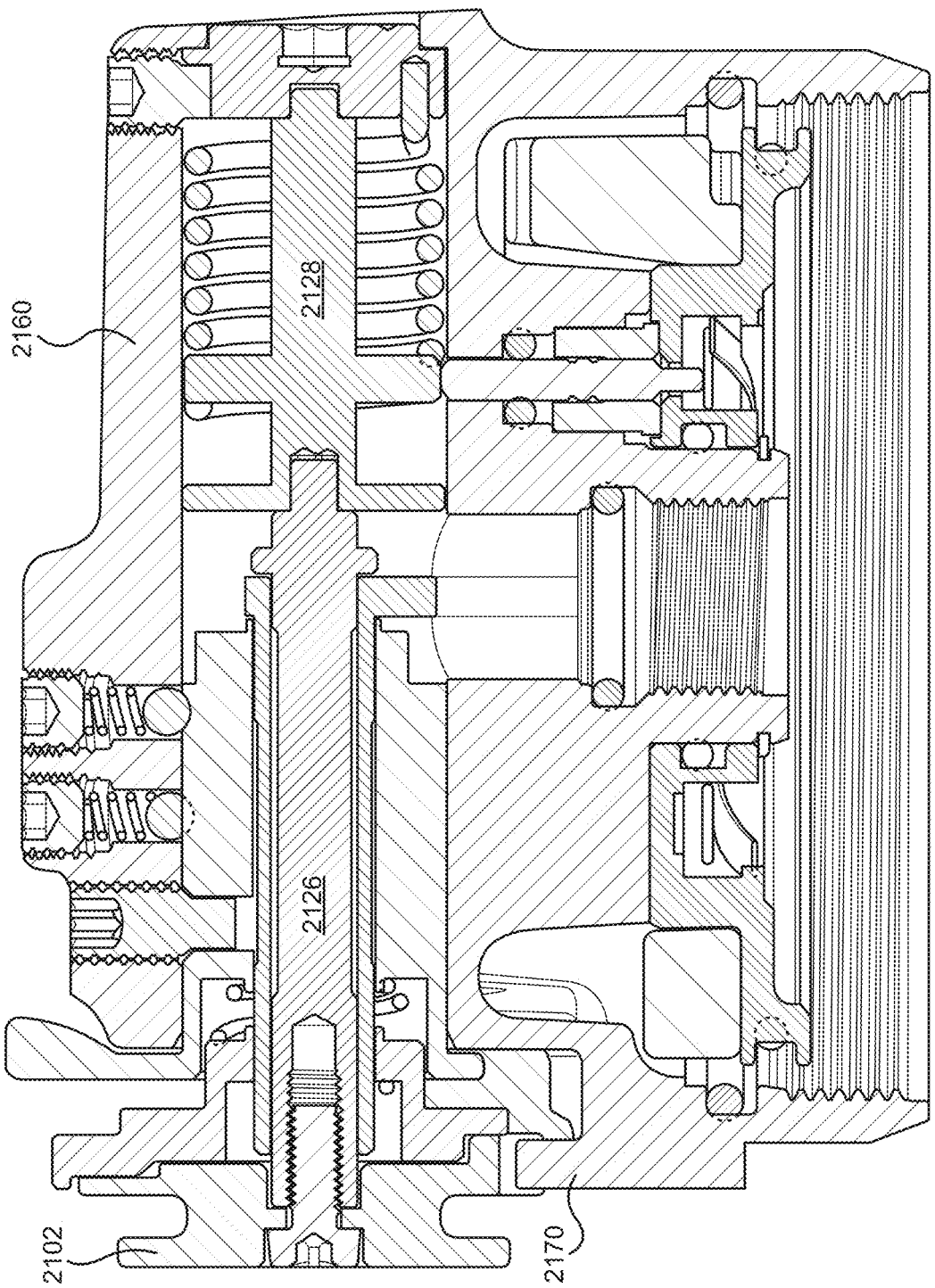
FIG. 21 shows an alternate close-up cross section view of the body cap end of an air spring shock in a second open mode.

FIG. 21 shows an alternate close-up cross section view of the body cap 2160 end of an air spring shock in a second open mode.

In this embodiment, stopper 1750 is not present to limit the rotational freedom of the pulley shaft 2126 and remote pulley 2102. Instead, hard stop 2170 is formed in body cap 2160 and acts directly against the remote pulley 2102. Also in this embodiment, air spring cam shaft 2128 is extended to compensate for the lack of a stopper feature on pulley shaft 2126.

It should be understood that while a needle and its surrounding architecture is not shown in FIG. 21, this is for the sake of simplicity and such features are still included in this embodiment.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments can be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What I claim is:

1. A shock adjuster comprising:
   a remote pulley;
   a pulley shaft, wherein the pulley shaft is coupled to the remote pulley at a first end, wherein the pulley shaft is coupled to an air spring cam shaft at a second end;
   an air spring needle, wherein the position of the air spring needle is determined by the position of the air spring cam shaft, wherein an air spring shim is engageable with the air spring needle;
   an open mode adjuster;
   a compression cam shaft, wherein the compression cam shaft is coupled to the open mode adjuster;
   a compression needle, wherein the position of the compression needle is determined by the position of the compression cam shaft; and
   a shim, wherein the shim is coupled to the compression needle, wherein the shim is fit to open or close at least a main port in a piston.

2. The shock adjuster of claim 1 wherein, the open mode adjuster allows for compression setting adjustments to be made without affecting the settings of the remote pulley.

3. The shock adjuster of claim 1 wherein, changing the setting of the remote pulley also moves the open mode adjuster.

4. The shock adjuster of claim 1 wherein, the pulley shaft has a ledge that acts to limit the rotational movement of the pulley shaft and the remote pulley.

5. The shock adjuster of claim 1 wherein, the shim is of an appropriate shape to cover the main ports and not a blow off valve.

6. The shock adjuster of claim 1 wherein, the profile of the compression needle acts to change the fluid flow allowed through a central port with the movement of the compression needle.

7. The shock adjuster of claim 1 wherein, fluid pressure is used to bias the air spring shim towards a closed position.

8. The shock adjuster of claim 1 wherein, the air spring shim is used to close off an auxiliary chamber from a primary chamber.

9. The shock adjuster of claim 1 wherein, the adjustment of the open mode adjuster is only effective during one of the settings of the remote pulley.

10. The shock adjuster of claim 1 wherein, the remote pulley is actuated remotely.

11. The shock adjuster of claim 1 wherein, the open mode adjuster is manually operated.

12. A shock adjuster comprising:
    a remote pulley;
    a pulley shaft, wherein the pulley shaft is coupled to the remote pulley at a first end, wherein the pulley shaft is coupled to an air spring cam shaft at a second end;
    an air spring needle, wherein the position of the air spring needle is determined by the position of the air spring cam shaft, wherein an air spring shim is engageable with the air spring needle;
    an open mode adjuster, wherein the open mode adjuster allows for compression setting adjustments to be made without affecting the settings of the remote pulley, wherein changing the setting of the remote pulley also moves the open mode adjuster;
    a compression cam shaft, wherein the compression cam shaft is coupled to the open mode adjuster;
    a compression needle, wherein the position of the compression needle is determined by the position of the compression cam shaft; and
    a shim, wherein the shim is coupled to the compression needle, wherein the shim is fit to open or close at least a main port in a piston.

13. The shock adjuster of claim 12 wherein, the pulley shaft has a ledge that acts to limit the rotational movement of the pulley shaft and the remote pulley.

14. The shock adjuster of claim 12 wherein, the shim is of an appropriate shape to cover the main ports and not a blow off valve.

15. The shock adjuster of claim 12 wherein, the profile of the compression needle acts to change the fluid flow allowed through a central port with the movement of the compression needle.

16. The shock adjuster of claim 12 wherein, fluid pressure is used to bias the air spring shim towards a closed position.

17. The shock adjuster of claim 12 wherein, the air spring shim is used to close off an auxiliary chamber from a primary chamber.

18. The shock adjuster of claim 12 wherein, the adjustment of the open mode adjuster is only effective during one of the settings of the remote pulley.

19. A shock absorber comprising:
    a damping cylinder, the cylinder telescopically coupled with an air spring cylinder;
    a rod, wherein the rod extends through the air spring cylinder and part way into the damping cylinder, wherein the rod is hollow;
    a main damping piston, the main damping piston coupled to the rod and configured for operation within the damping cylinder, the main damping piston configured to divide the damping cylinder into a compression chamber and a rebound chamber; and
    a shock adjuster, the shock adjuster comprising:
      a remote pulley;
      a pulley shaft, wherein the pulley shaft is coupled to the remote pulley at a first end, wherein the pulley shaft is coupled to an air spring cam shaft at a second end;
      an air spring needle, wherein the position of the air spring needle is determined by the position of the air spring cam shaft, wherein an air spring shim is engageable with the air spring needle;
      an open mode adjuster;
      a compression cam shaft, wherein the compression cam shaft is coupled to the open mode adjuster;
      a compression needle, wherein the position of the compression needle is determined by the position of the compression cam shaft, wherein the compression needle is in the center of the rod; and
      a shim, wherein the shim is coupled to the compression needle, wherein the shim is fit to open or close at least a main port in the main damping piston.

20. The shock absorber of claim 19 wherein, the open mode adjuster allows for compression setting adjustments to be made without affecting the settings of the remote pulley.

* * * * *